United States Patent [19]

Laskowski et al.

[11] 4,046,467

[45] Sept. 6, 1977

[54] ZOOM LENS COPIER

[75] Inventors: Kenneth W. Laskowski, Fairport; Edward L. Steiner, Macedon, both of N.Y.

[73] Assignee: Xerox Corporation, Stamford, Conn.

[21] Appl. No.: 577,379

[22] Filed: May 14, 1975

[51] Int. Cl.² .................... G03G 15/00; G03B 27/34

[52] U.S. Cl. .................... 355/3 R; 355/14; 355/57

[58] Field of Search .................... 355/3 R, 3 CH, 14, 55

[56] References Cited

U.S. PATENT DOCUMENTS

| | | | |
|---|---|---|---|
| 3,355,236 | 11/1967 | Taillie et al. | 350/187 |
| 3,397,627 | 8/1968 | Bruning et al. | 355/55 X |
| 3,532,045 | 10/1970 | Genahr | 355/56 X |
| 3,556,655 | 1/1971 | Lux et al. | 355/55 |
| 3,600,066 | 8/1971 | Del Vecchio | 355/58 X |
| 3,655,281 | 4/1972 | Warren | 355/55 X |
| 3,666,366 | 5/1972 | Keeble et al. | 355/56 |
| 3,685,894 | 8/1972 | Lux et al. | 355/3 R |
| 3,689,143 | 9/1972 | Caso et al. | 355/3 R |
| 3,709,603 | 1/1973 | Furuichi | 355/3 R X |
| 3,778,147 | 12/1973 | Reehil et al. | 355/57 X |
| 3,779,642 | 12/1973 | Ogawa et al. | 355/55 |
| 3,806,241 | 4/1974 | Gregg et al. | 355/14 X |
| 3,827,803 | 8/1974 | Shelffo et al. | 355/3 R |
| 3,829,209 | 8/1974 | Buddendeck et al. | 355/14 |
| 3,851,966 | 12/1974 | Reehil et al. | 355/14 X |
| 3,860,338 | 1/1975 | Reehil | 355/55 |
| 3,901,593 | 8/1975 | Kogiso et al. | 355/3 R X |
| 3,909,128 | 9/1975 | Sohm | 355/14 X |
| 3,967,896 | 7/1976 | Looney et al. | 355/14 |

*Primary Examiner*—George H. Miller, Jr.

[57] ABSTRACT

An imaging lens system for electrostatic type reproduction machine or copiers utilizing a zoom lens effective to provide, within the magnification limits of the lens, infinitely variable image sizes.

A control is provided to pre-set the lens to automatically give, upon actuation, at least one preselected image size, with an override control to enable the lens to be set to provide any image size regardless of pre-set conditions.

Further controls are provided for the machine non-image erase mechanism to automatically compensate for changes in the image borders brought about by changes in image size due to resetting of the zoom lens. For this purpose, an infinitely variable edge fadeout apparatus is provided incorporating movable shutters to vary the effective size of the edge erasure slots in correspondence with image size together with timing controls for changing the operational timing of the pitch fadeout lamp in response to changes in image size upon resetting of the zoom lens. Further controls enable the critical positioning of the image produced by the zoom lens on the photosensitive member to be adjusted to assure that the image, whatever the size, is optimally positioned on the copy produced with other controls to enable the image, whatever the size produced by the zoom lens, to be physically moved or offset on the copy.

14 Claims, 9 Drawing Figures

ZOOM LENS COPIER

This invention relates to an imaging system for reproduction machines and more particularly to an imaging system and method for providing infinitely variable image sizes.

In reproduction machines or copiers, it is often desirable to vary the size of the image produced. This is useful for example, when relatively large size originals are to be copied and it is desired to reduce the size of the copy for easier handling. The prior art suggests various ways for effectuating alterations in the image size during the copying process as for example through the use of add-on lenses to provide different preset magnification changes.

Alternately, a zoom lens may be employed which, within the range of lens design, provides an infinitely variable image size. However, while an ability to provide an infinitely variable image offers certain advantages, other problems arise, particularly in the effect of changes in image size on associated operating components of the reproduction machine itself. For it has been found advantageous to prevent, or at least inhibit, development of areas of the machine photosensitive member outside the image confines, i.e. along the image borders, and before and after the image. For this purpose, image erase devices normally in the form of small exposure lamps are provided to discharge, that is erase, the photosensitive member, the timing and length of exposure of the erase device being correlated to the image size. Where, however, an infinitely variable image size range, such as provided by a zoom lens, is available, operation of the erase devices becomes more difficult in the correlation of operation of the erase devices with zoom lens settings.

Further, some difficulty has been experienced heretofore in properly locating, in the aforementioned add-on lens type system, the various size images in correct position. This of course is critical if acceptable copies are to be produced, and entails recognition of the fact that equipment limitations and aging may result in image placements different from that desired or expected. To accommodate this, the control circuitry may provide means to adjust the timing of the flash exposure lamps. In the case of an exposure system utilizing a zoom lens, the multitude of potential image sizes are infinitely greater and hence more difficult to obtain conveniently.

In modern high speed reproduction machines particularly, it may be desirable to place the copies produced in finished form. While finishing may take several forms and entail several additional operations, two popular types involve stapling or binding the copies into book form. A problem however often associated with both of these types of finishing operations is the relatively large amount of margin area needed for this purpose, often with loss or damage to critical informational areas of the original being copied.

It is therefore a principle object of the present invention to provide a new and improved exposure system for electrostatic reproduction machines.

It is a further object of the present invention to provide an exposure system and method for copiers incorporating an infinitely variable lens.

It is an object of the present invention to provide a new and improved control for a copier zoom lens.

It is an object of the present invention to provide a zoom lens exposure apparatus for copiers effective to provide both pre-set and infinitely variable image sizes.

It is an object of the present invention to provide, in an electrostatic reproduction machine having a zoom lens, mechanism for varying the size of the nonimage areas erased as a function of zoom lens setting.

It is an object of the present invention to provide an improved side edge deletion apparatus for a zoom lens copier effective to provide an infinitely variable deletion area in inverse correspondence with the size images produced by the zoom lens.

It is an object of the present invention to provide, in an electrostatic reproduction machine having a zoom lens, a system having means to fadeout leftover nonimage areas on the machine photosensitive member before, between, and after the electrostatic images formed thereon.

It is a further object of the present invention to provide, in a zoom lens copier, control mechanisms to permit the location of the image formed by the lens on the copier photosensitive member to be changed.

It is an object of the present invention to provide, in an electrostatic reproduction apparatus, means to offset the image produced on the copy substrate material and thereby increase the margin area available for subsequent processing together with infinitely variable lens means to enable the size image to be matched with the available substrate area to avoid copy deletion.

This invention relates to a reproduction apparatus, the combination comprising a movable photosensitive member on which latent electrostatic images of originals being reproduced are formed together with means to charge the member in preparation for imaging; exposure means for generating the image; and developing means to develop the images and render the images visible, the exposure means including a zoom lens adapted to provide within predetermined maximum and minimum lens stops the images in infinitely variable size, and drive means for moving the zoom lens to change the setting of the zoom lens and the size of the images produced; and lens control means adapted when actuated to energize the lens drive means to move the lens to a preset position whereby to produce an image of predetermined magnification; and means to override the present lens control means and energize the drive means to move the zoom lens to any position between the lens stops whereby to produce an image of selected magnification.

The invention further relates to the method of producing copies electrostatically using a movable photoreceptor, the steps comprising: flash illuminating an original to be reproduced to produce a light image representative of the original; projecting the light image by means of an infinitely variable lens means onto the photoreceptor whereby to form a latent electrostatic image of the original on the photoreceptor for development and transfer to copy substrate material; changing actuation of the illuminating flash to displace the light image produced on the photoreceptor and the position of the developed image on the copy substrate material; and operating the lens means to adjust the size of the light image projected by the lens means onto the photoreceptor so as to produce a copy of the entire original without deletion due to displacement of the image.

Other objects and advantages will be apparent from the ensuing description and drawings in which.

Figure 1:
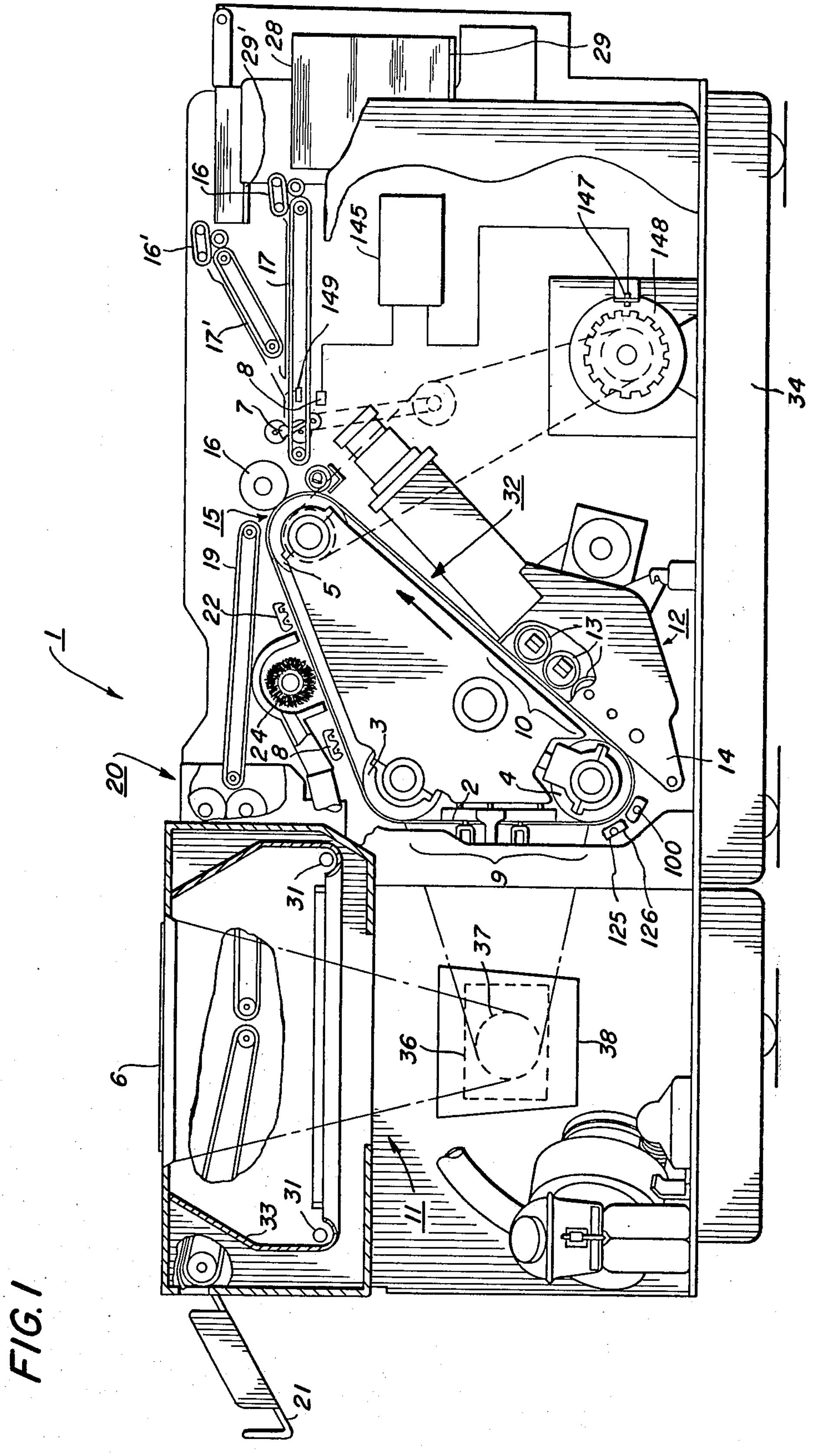
FIG. 1 is a side view with partial cut away of an electrostatic reproduction machine incorporating the zoom lens system of the present invention.

Referring to FIG. 1, an exemplary copier/reproduction machine designated generally by the numeral 1, and incorporating the infinitely variable magnification apparatus and control of the present invention is there shown. Reproduction machine 1 provides, within preset limits, infinitley variable image size which may for example range from a 1:1 image size to a 0.65:1 reduction. Other image size reduction ranges as well as image magnifications may be contemplated.

Reproduction machine 1 includes the electrically photosensitive member in the form of an endless web or belt 2. Belt 2 is supported for travel in an endless generally triangular path by rollers 3, 4 and 5. One or more of the belt supporting rollers 3, 4, 5 is drivingly coupled to a suitable motor to move belt 2 in the direction shown by the solid line arrow. Rollers 3, 4, 5 are rotatably journaled in a substantially triangular belt module 32, shown best in FIG. 2, which in turn is releasably and operably mounted on main frame 34 of machine 1.

As will be understood by those skilled in the art, the surface of the moving belt 2 is charged by a suitable charging device, such as corotron 8 in preparation for imaging. The charged surface then moves through an exposure station 9 whereat the belt is exposed to a light image of the original 6 being copied as produced by an exposure mechanism 11. Exposure to light alters the electrostatic charge on the photosensitive belt 2 in conformance with the original 6 to produce a latent electrostatic image of original 6 on belt 2.

The latent electrostatic image produced on belt 2 is then carried past developing station 10 where the image is developed, i.e. rendered visible by developing apparatus 12. The developing apparatus 12 illustrated includes a plurality of magnetic brush developer rolls 13 which serve to bring electrically charged marking or toner particles from a suitable developer mixture in sump 14 into proximity with belt 2 and the latent image thereon. The electrostatic charges on belt 2 attract the toner particles onto the belt in imagewise configuration to provide a visible toner delineated image. The belt 2 bearing the developed image thereafter passes through a transfer station 15 whereat the developed image is electrostatically transferred to a transfer material such as copy sheets 28. To facilitate the aforementioned transfer operation, a bias transfer roll 16 is provided.

Copy sheets 28 which are stored in supply tray 29, are brought forward to transfer station 15 by appropriate means such as conveyors 16, 17. An auxiliary supply of copy sheets 28, in the form of supply tray 29' may be provided. In that case, additional conveyors 16', 17' are provided to advance sheets from the auxiliary tray 29'.

Following transfer, the copy sheet 28, bearing the toner image, is carried by a conveyor 19 to a suitable fusing mechanism 20 where the toner image is permanently fixed to copy sheet 28. The finished copy sheet is thereafter transported to output tray 21.

Following transfer of the developed image therefrom, belt 2 is reconditioned in preparation for re-imaging. In accordance therewith, residual charges on belt 2 may be neutralized or reduced by means of preclean corotron 22 and thereafter the belt surface may be cleaned by a brush 24. Brush 24 is preferably housed in an evacuated chamber which serves to draw off particulate material, normally toner, removed from the surface of belt 2 by brush 24.

Figure 2:
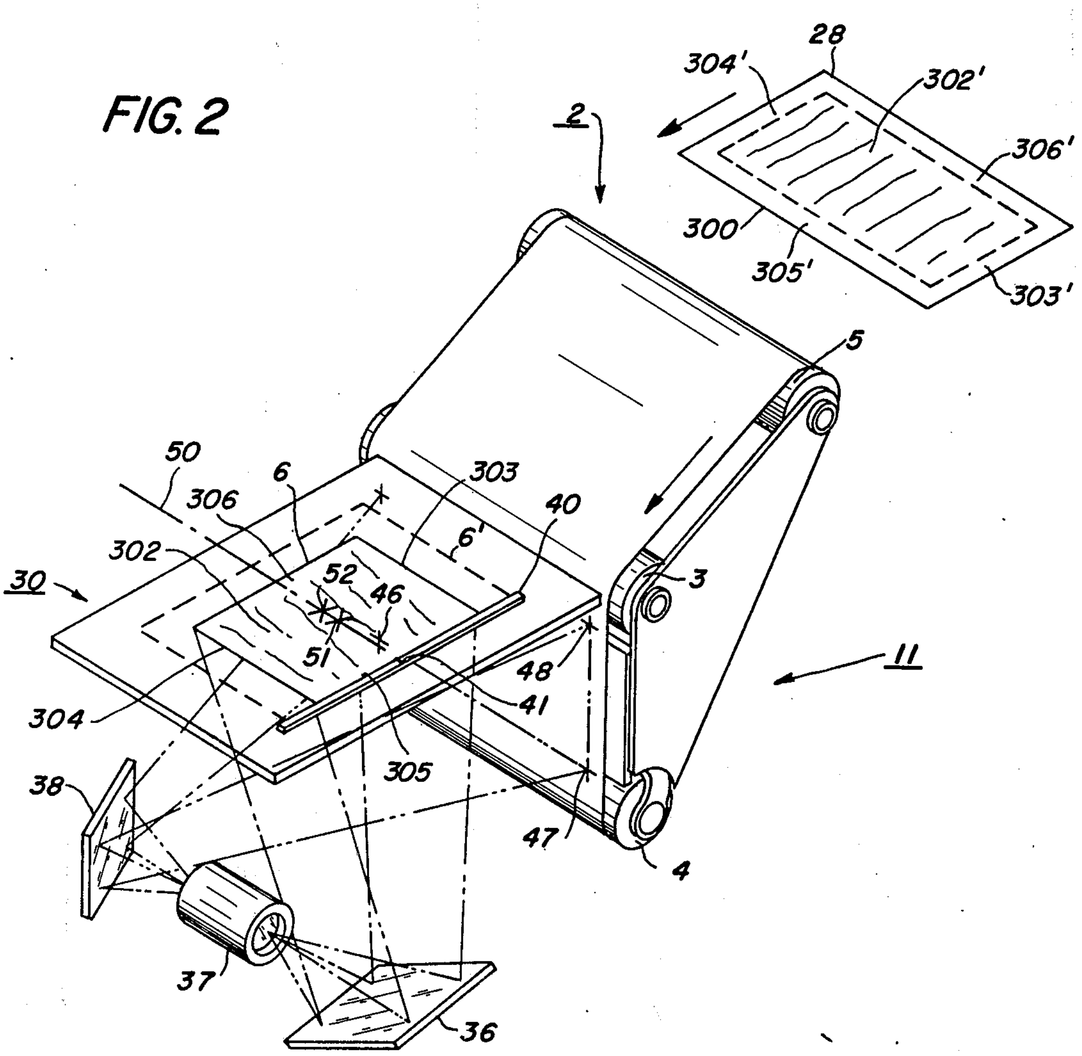
FIG. 2 is an isometric view of the exposure system used with the present invention.

Referring to FIG. 2, exposure mechanism 11 includes a transparent platen 30 on which an original 6 to be copied rests. Suitable illumination means such as flash lamps 31 with cooperating mirror reflectors 33 illuminate platen 30 and the original 6 thereon. The resulting light image of the original 6 is transmitted onto belt 2 at exposure station 9 via object mirror, 36, lens 37 and image mirror 38. As will appear, lens 37 comprises a zoom type lens adapted to provide, within preset maximum and minimum limits, a light image of selected size on belt 2 at exposure station 9.

The duration of the exposure, i.e. the length of time the lamps 31 generate radiation, is such that the moving belt 2 can be assumed stationary during the exposure period. Consequently, the location of an image on the belt may be controlled by changing the instant at which lamps 31, are triggered.

A linear registration guide 40 is preferably provided on platen 30, guide 40 having a calibrated straight edge with means such as a mark 41 for registering an original 6 in one direction, i.e. sideways relative to belt 2. This alignment establishes the location of the latent electrostatic image on belt 2 between the side edges of belt 2 as shown by the imaginary registration marks 46 and 47 in FIG. 2. The location of the latent image along the belt axis, represented by imaginary registration marks 47 and 48, is established by alignment of the optical axis of lens 37 relative to original 6 and the belt 2.

Referring to FIG. 2, coordinate 50 represents the dimension of the latent image along which a change will occur when different size originals are aligned to the registration guide 40. The coordinate defined by a line between imaginary marks 47 and 48 is parallel to the coordinate 50 if the effect of mirrors 38 and 39 is ignored. Cross marks 51 and 52 represent the geometric center of two arbitrarily selected originals 6, 6' of different size. These geometric centers lie on coordinate 50 because one edge of each original 6, 6' is centered (assuming for the present that centering defines the desired border condition) to mark 41 on registration guide 40. This means that when the lens 37 is displaced along the optical axis to change the magnification, the location of the projected image relative to the imaginary marks 47 and 48 changes. The shift in latent image location causes a copy of original 6 to have different border dimensions than a copy of original 6'.

Figure 3:
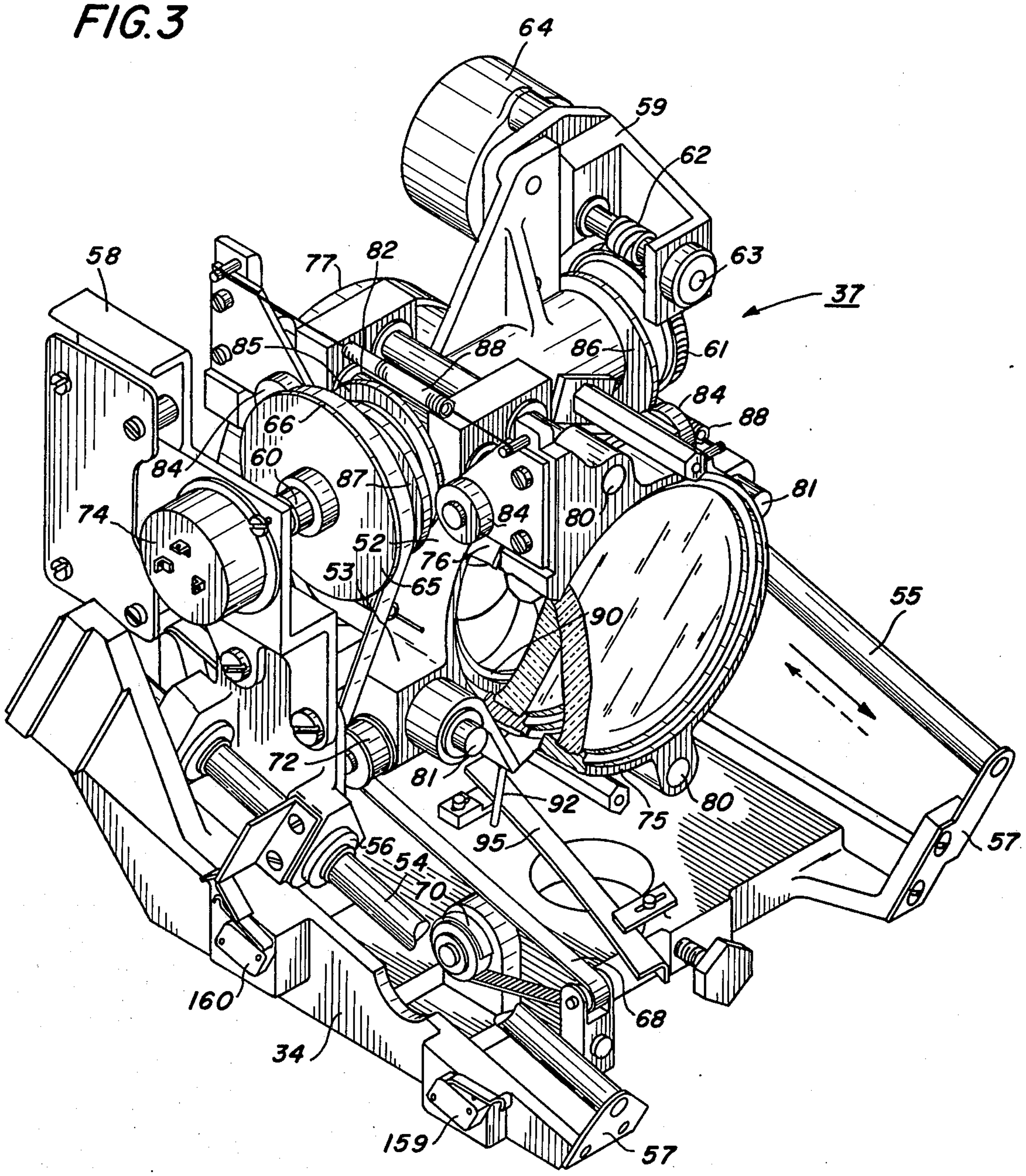
FIG. 3 is an isometric view of the zoom lens for the machine shown in FIG. 1.

Referring particularly to FIG. 3, lens 37 comprises a multi-element zoom lens such as shown and described in copending application Ser. No. 393,844 filed Sept. 4, 1973. The lens elements that comprise lens 37 are encased in a housing 52 which in turn is supported upon a carriage 53. Carriage 53 is movable axially between object and image mirrors 36, 38 respectively and for this purpose is slidably journaled upon a pair of spaced, parallel rails 54, 55 by bearing blocks 56. Rails 54, 55 have a preset inclination designed to retain one edge of the image generated on belt 2 in fixed position, corresponding to that of registration guide 40 through the various magnification changes. Rails 54, 55 are supported upon the main frame 34 of copying machine 1 as by brackets 57.

Lens carriage 53 has a generally upstanding side member 58, 59 between which lens 37 is cradled. A cross shaft 60 is rotatably journaled by suitable bearing means (not shown) in side members 58, 59. A gear 61 on one side of shaft 60 meshes with worm drive gear 62 carried by shaft 63 of reversible drive motor 64 to provide selective back and forth movement of carriage 53, and lens 37 along rails 54, 55 as will appear more fully hereinbelow.

The opposite end of cross shaft 60 carries driving gear 65. Teeth 66 on gear 65 mesh with a toothed drive belt 68, one end of which is fixed to machine frame 34 adjacent one terminus of movement of lens carriage 53 while the opposite end is fixed to frame 34 adjacent the opposite terminus of lens carriage movement via an adjustable ratchet type clutch 70. The intermediate portion of belt 68, which overlays driving gear 65, is retained in mesh therewith by means of roller pair 72, the arrangement being such that belt 68 is held under preset tension through adjustment of clutch 70 so as to assure that belt 68 remains in mesh with gear 65 throughout the span of movement of lens carriage 53.

Lens 37 has plural lens elements (not shown). To sustain focus during movement of the lens proper while lens 37 varies the size of the image projected onto belt 2, certain of the lens elements that comprise lens 37 are themselves displaced within the lens body as the lens 37 is moved between image and object mirrors 36, 38 respectively. In the exemplary lens illustrated, three of the lens elements that comprise zoom lens 37 are displaced in preset relation to the remaining lens elements and themselves during movement of the lens body. The aforesaid lens elements are supported within barrel like members 75, 76, 77. While the zoom lens embodiment illustrated contemplates three displaceable lens elements, other zoom lens types having different lens element configurations may be envisioned.

Each of the lens barrels, 75, 76, 77 is slidably supported upon axially extending rod pairs 80, 81, 82 respectively. Rod pairs 80, 81, 82 are in turn stationarily mounted on lens carriage 53 by suitable means (not shown). Each lens barrel 75, 76, 77 carries a cam follower element 84 at one side thereof engageable with cams 85, 86, 87 respectively on cross shaft 60. Springs 88 retain cam followers 84 in operative contact with cams 85, 86, 87.

Cams 85, 86, 87 are individually formed to present a predetermined configuration adapted, on rotation of cross shaft 60 to displace the lens elements housed in lens barrels 75, 76, 77 by a preselected amount as the lens 37 moves back and forth along rails 54, 55. As understood by those skilled in the art, such relative displacement of certain of the individual lens elements that comprise zoom lens 37 effects, upon movement of lens 37, a change in magnification without loss of focus.

To control the amount of light passing through lens 51, lens 51 includes an adjustable iris diaphragm supported within barrel like member 90. The iris diaphragm has a projecting arm 92 for changing the aperture provided by the diaphragm elements therewithin. To provide automatic aperture adjustment, in correspondence with movement of lens 37, a stationary cam surface 95 is provided on machine frame 34 below lens carriage 53 and against which arm 92 bears. Cam surface 95 is of a preset configuration designed to provide a selected aperture setting for each position of lens 37. On movement of lens 37 along rails 54, 55, engagement of arm 92 with cam surface 95 displaces arm 92 to set the iris diaphragm and change the aperture setting of lens 37.

As described, movement of lens 37 changes the size of the light image projected onto belt 2. Since corotron 8 charges belt 2 across substantially the entire width of belt 2, any reduction in image size below the maximum width of belt 2 that is charged leaves an area on belt 2 along each side of the light image that is not exposed. If left in this condition, these unexposed side areas, which bear a relatively strong electrostatic charge, would produce a heavy deposit of toner, resulting in printout on the copying sheet 28 of a heavy black border along each side of the image. To prevent this, an edge fadeout or erase assembly 100 is provided between exposure and developing stations 9, 10 respectively.

Figure 4:
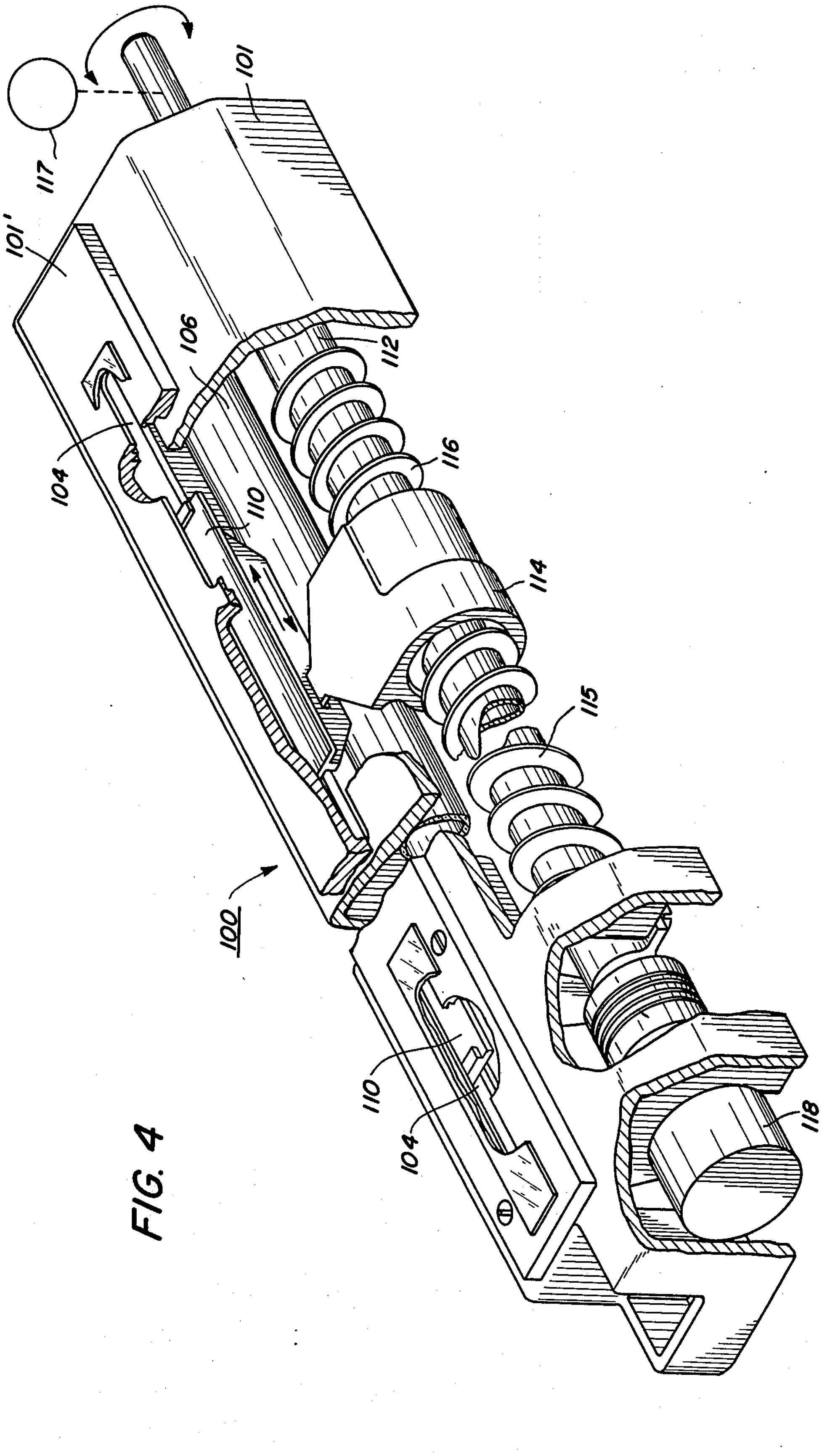
FIG. 4 is an isometric view of the variable edge fadeout apparatus for the machine shown in FIG. 1.

Referring to FIG. 4 of the drawings, edge fadeout assembly 100 includes a generally rectangular box like housing 101 supported on machine frame 34. Housing 101 is of a length sufficient to span the width of belt 2. A slot like opening 104, is provided in wall 101' of housing 101 facing belt 2 adjacent each end thereof. Each slot 104, extends from a point substantially opposite the edge of belt 2 inwardly toward the belt centerline, the length of slots 104, being sufficient to accommodate the range of image sizes from maximum to minimum.

Cylindrical erase lamp 106 is supported within housing 101 opposite slots 104. Lamp 106 which is electrically connected to a suitable source of energy, serves when actuated to erase charges from the portion of belt 2 exposed to slots 104.

To control the size of the area erased, a shutter 110, is provided for each slot 104, shutters 110 being slidably supported within housing 101 for movement over slots 104. Shutters 110, which are formed from a suitable opaque material serve to close off some or all of the length of slots 104, and hence regulate the portion of belt 2 subjected to illumination from lamp 106.

To move shutters 110, and vary the effective length of slots 104, a rotatable barrel cam 112, having on the periphery thereof spaced oppositely threaded segments 115, 116 is provided. A pair of follower elements 114 ride on each of the threaded cam segments 115, 116, each element 114 having suitable internal driver means for drivingly coupling elements 114 with the threaded segments 115, 116 of cam 112. Shutters 110, are secured to follower elements 114.

Cam 112 is rotatably journaled on shutter housing 101 by bearings. Reversible drive motor 117, which is connected to cam 112, serves to turn cam 112 in either a clockwise or counterclockwise direction. Potentiometer 118 which is operatively coupled to cam 112 adjacent the opposite end thereof, functions to measure the rotational position of cam 112, and, as will appear, the position of shutters 110.

Rotation of barrel cam 112 in one direction serves, through the action of threaded segments 115, 116 thereof, to displace shutters 110, toward one another to increase the effective width of slots 104, while rotation of cam 112 in the reverse direction serves to displace shutters 110 away from one another to reduce the effective width of slots 104. As will appear, movement of shutters 110 is correlated with the dispostion of zoom lens 37.

Referring to FIG. 1, to discharge areas of belt 2 before, between and after images and thereby prevent development and objectionable printout, a pitch erase lamp 125 is provided. Lamp 125, which is mounted within lamp housing 126, is supported adjacent belt 2 between fadeout assembly 100 and exposure station 9, with lamp 125 extending substantially perpendicular to the direction of belt movement. The longitudinal dimension of lamp 125 and housing 126 thereof is preferably equal to or slightly greater than the width of belt 2.

Figure 5:
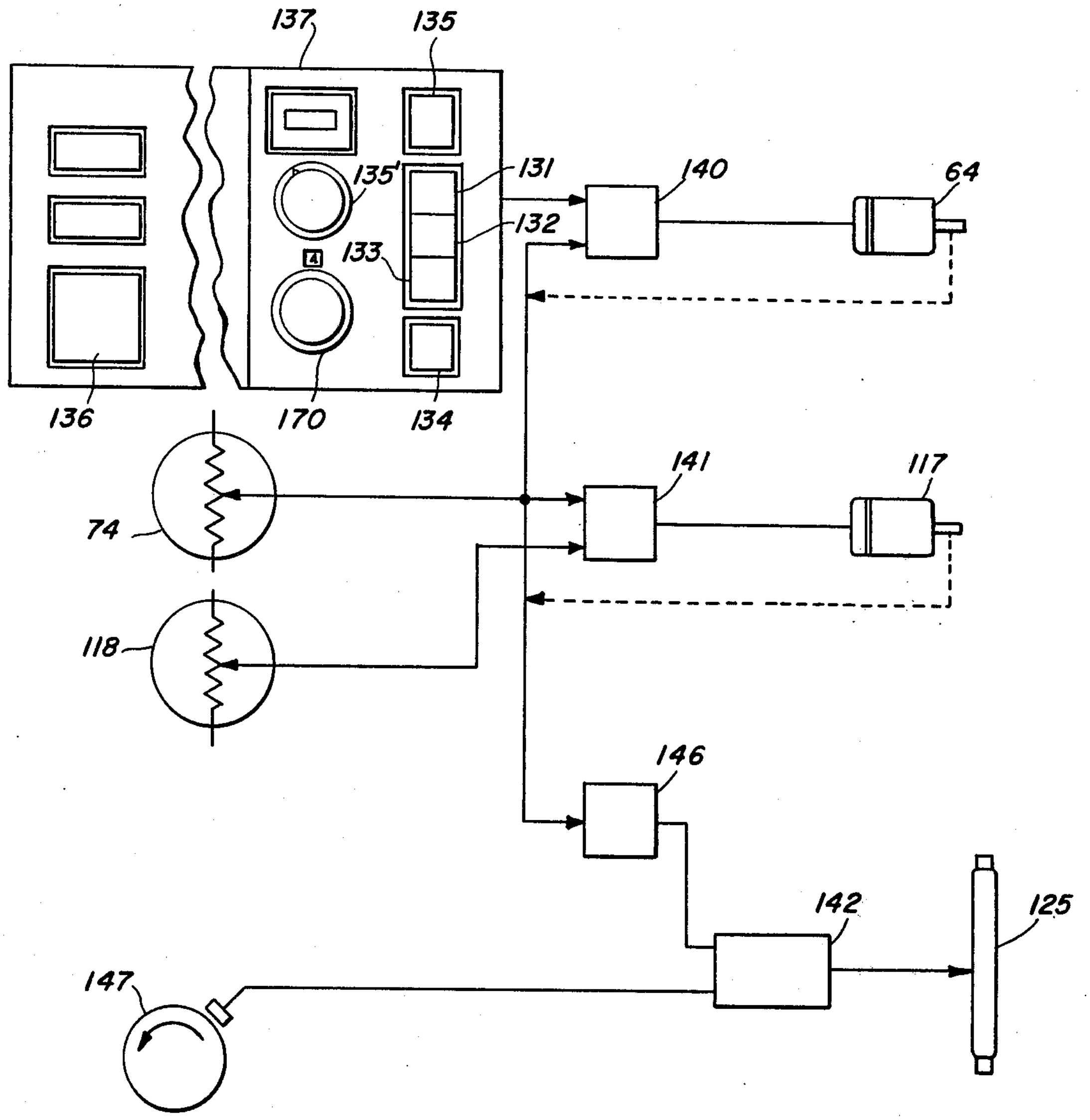
FIG. 5 is a block diagram outlining the zoom lens control logic.

Referring now to the control schematic of FIG. 5, the setting of lens 37 to certain preset magnifications and hence the size of the image projected onto belt 2 is exercised through a series of manual selectors 131, 132, 133, 134. Selectors 131, 132, 133, 134 are mounted on a suitable control panel 137, each selector serving when actuated, to set lens 37 in a predetermined position and thereby provide an image of preset size.

Selectors 131, 132, 133, 134 each work through a potentiometer 131', 132', 133', 134' (FIG. 6) effective to produce, upon actuation of the selector associated therewith, a control signal of predetermined voltage, the signal voltage level representing a preset setting of lens 37 with equivalent image size. Potentiometers 131', 132', 133', 134', may be individually adjustable, as by a service representative to change the preset control signal voltage produced. This in turn changes the setting of lens 37 upon actuation of the selector 131, 132, 133 or 134 therefor.

Selector 134 and the potentiometer 134' associated therewith represent the clear or home, i.e. home position for lens 37. Conveniently, this may comprise a 1:1 magnification or no change in image size. It will be understood, however, that clear or normal selector 134 may be set to produce any desired image size, within the limits of lens 37, by adjustment of potentiometer 134' thereof. Selectors 131, 132, 133 represent different sizes, i.e. reductions, such as 0.63:1, 0.75:1 and 0.90:1 respectively.

To permit an image of any size, within the maximum and minimum afforded by lens 37, to be selected, an operator adjustable potentiometer 135' is provided with zoom selector 135. Setting of potentiometer 135' varies the voltage of the control signal output therefrom and hence the setting of lens 37 and the size of the image produced as will appear. Zoom selector 135 is disposed on panel 137, actuation of selector 135 enabling potentiometer 135'.

The signal outputs of potentiometers 131', 132', 133', 134' and 135' are fed to one side of a comparator circuit 140 while the signal output from potentiometer 74, the voltage value of which represents the present setting of lens 37, is fed to the other side of circuit 140. Circuit 140 operates lens drive motor 64 in either the forward or reverse direction until the signal input from potentiometer 74 matches the signal input from the potentiometer 131', 132', 133', 134', or 135' actuated. A feed back loop monitors operation of lens drive motor 64.

A second comparator circuit 141 is provided to correlate the size of edge fadeout slots 104 with the size image produced by lens 37. Circuit 141 compares the signal inputs from potentiometer 74 and shutter potentiometer 118, and operates shutter driving motor 117 in either a forward or reverse direction until the signals input to circuit 141 match. A feedback loop is provided to monitor operation of motor 117.

A third comparator circuit 142 is provided to correlate the on/off timing of pitch fadeout lamp 125 with the size of the image produced by lens 37. Circuit 142 compares the signal output of lens potentiometer 74 with the timed lamp control pulses from the machine logic 145 which turns lamp 125 on and off.

In addition to the above mentioned controls for selecting the image size and setting lens 37, other controls for operating reproduction machine 1 may be conveniently provided on panel 137, i.e. copy quantity selectors, mode selectors, and print-start push button 136. Actuation of print button 136 initiates the copying cycle.

Reproduction machine 1 includes master control logic 145 (seen in FIG. 1) for operating the machine components in synchronous order to produce copies. In order to achieve internal synchronism of the various machine components, a suitable pulse generator 147 is provided, which produces a train of pulses for use in timing machine operation. Conveniently, pulse generator 147 is driven from the machine main drive motor 148.

To correlate and time operation of machine 1, the stream of pulses from generator 147 are segregated into blocks or pitches by means of a second pulse generating device correlated with a preset point in the machine processing cycle. In reproduction machine 1, the aforementioned processing point is the copy sheet register point at the inlet to transfer roll 16 as set by register fingers 7 (see FIG. 1). Register fingers 7 are rotated by the machine drive motor 148, a suitable signal generating pickup 8 being provided to generate a pulse each time fingers 7 reach a preset point in each revolution thereof. Copy sheets 28 are registered by fingers 7 with the image on belt 2 at this point.

Additionally, reproduction machine 1 includes various devices, represented herein by paper jam switch 149 for sensing internal malfunctions, i.e. paper jams, low toner supply, failure to strip a copy sheet from belt 2, etc.

Figure 6:
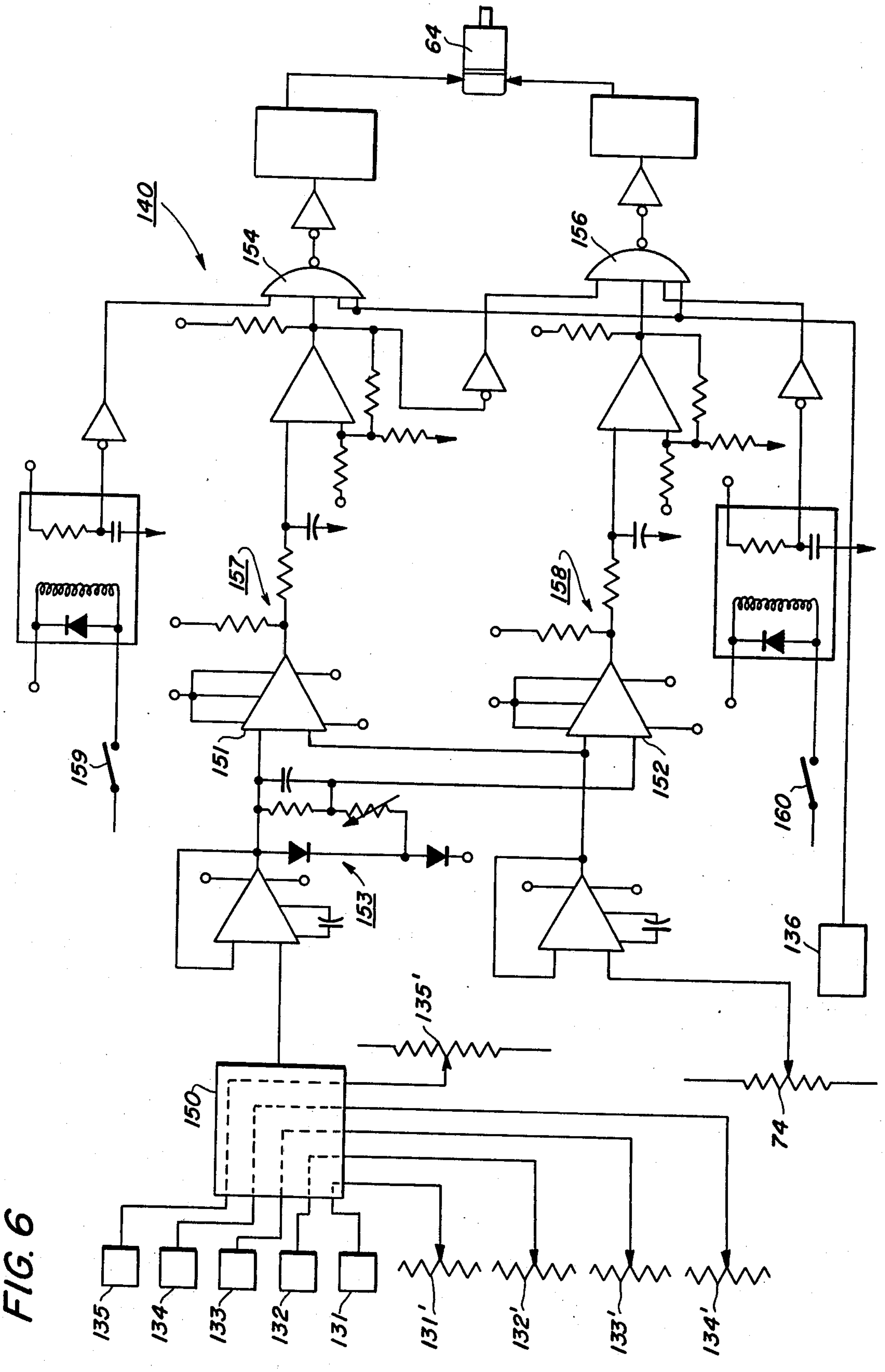
FIG. 6 is a logic schematic of the zoom lens positioning control of the present invention.

Referring now to FIG. 6, comparator circuit 140 includes a suitable analog switch 150 to which the individual signal outputs of potentiometers 131', 132', 133', 134' and 135' are inputted. Switch 150 responds to the controlling signals from selectors 131, 132, 133, 134 and 135 to produce an output signal of a voltage corresponding to the setting of the potentiometer 131', 132', 133', 134' or 135' selected.

The signal output of analog switch 150 is fed to comparator gates 151, 152. The signal input to gate 152 is via voltage reduction circuit 153, which serves to reduce the signal voltage to gate 152 to provide a signal differential or window for homing lens carriage 53 into the position corresponding to the magnification selected as will appear.

The output signal of lens potentiometer 74, the voltage value of which reflects the instantaneous position of lens carriage 53, is inputted to gates 151, 152 for comparison purposes. The output signal of comparator gates 151, 152 control operation of motor 64 through forward and reverse circuits 154, 156 respectively. Suitable timing circuits 157, 158 maintain the signal outputs of gates 151, 152 for a preset interval following inactivation of gates 151, 152 respectively to offset inertia of the lens driving mechanism and assure stopping of lens carriage 53 in the position selected as will appear.

An enabling signal from machine print-start button 136 to motor drive circuits 154, 156 restricts operation of lens drive motor 64 to periods of machine operation. Signal inputs from lens carriage limit switches 159, 160 prevent over-driving of carriage 53 along rails 54, 55.

Presuming lens carriage 53 to be in the home position as determined by the setting of the potentiometer 134' associated with clear selector 134, actuation of one of the selectors 131, 132 or 133 produces a preset voltage signal at comparator gate 151. At the same time, a second signal of slightly different voltage appears at gate 152. Since the new signals to gates 151, 152 differ from the signal inputted thereto by lens potentiometer 74, indicating that lens carriage 53 is not in the position desired, a signal output appears at either gate 151 or 152 depending on the relative polarities of the input signals thereto. Presuming lens carriage 53 must move forward (in the direction of the solid line arrow in FIG. 3), gate 151 produces a trigger signal on forward drive circuit 154. Presuming enabling signals from print button 136 and limit switch 159 to be present, motor 64 is energized in the forward direction to drive lens carriage 53 along rails 54, 55 in the direction shown by the solid line arrow of FIG. 3. As carriage 53 moves, the several elements of lens 37 are reset to change the size of the image projected onto belt 2.

As lens carriage 53 moves, the signal voltage produced by potentiometer 74 changes and approaches that of the signal input provided by the potentiometer 131', 132', or 133' that has been selected. On the signal inputs to comparator gate 151 becoming equal, the signal output therefrom ceases. However, the trigger signal to forward drive circuit 154 is sustained for a preset interval by timing circuit 157. This results in lens carriage 53 being driven past the position represented by the potentiometer 131', 132', or 133' selected. Following expiration of the preset interval, circuit 154 is inactivated stopping motor 64.

With lens carriage 53 past the position desired, the signal input from the potentiometer 131', 132' or 133' selected and the signal input from potentiometer 74 to comparator gate 152 differ, in the opposite polarity, and gate 152 produces a signal triggering reverse drive circuit 156 to operate lens motor 64 in the reverse direction and move lens carriage 37 backwards. As lens carriage 53 reaches a position just before the position selected, the signal input from lens potentiometer 74 equals the reduced signal input from circuit 153 terminating the signal output of gate 152. However, the trigger signal to reverse drive circuit 156 is sustained by timing circuit 158 for a relatively short interval during which lens carriage 53 is brought into the predetermined position associated with the selector 131, 132 or 133 previously actuated.

Where the selection made requires movement of lens carriage 53 in the reverse direction, as for example, if clear selector 134 was now actuated, the disparate signal inputs from potentiometer 134' (reduced slightly by circuit 153) and from lens potentiometer 74, are responded to by comparator gate 152 which triggers reverse drive circuit 156 to operate motor 64 and move lens carriage 53 in the direction shown by the dotted line arrow in FIG. 3 until the signal inputs to gate 152 are the same. As described, timing circuit 158 sustains the triggering signal input to circuit 156 and operation of motor 64 for a relatively short interval thereafter to bring lens carriage 53 to the correct position.

Where it is desired to position lens manually through the use of manual zoom selector 135, potentiometer 135' is set manually by the operator to the magnification desired and zoom selector 135 actuated. The resulting signal output of potentiometer 135', the voltage value of which reflects the lens setting desired, is inputted to comparator gates 151, 152 and forward and/or reverse drive circuits 154, 156 are triggered to operate lens motor 64 and move carriage 53 in the manner described heretofore until lens 37 is set for the magnification selected.

Figure 7:
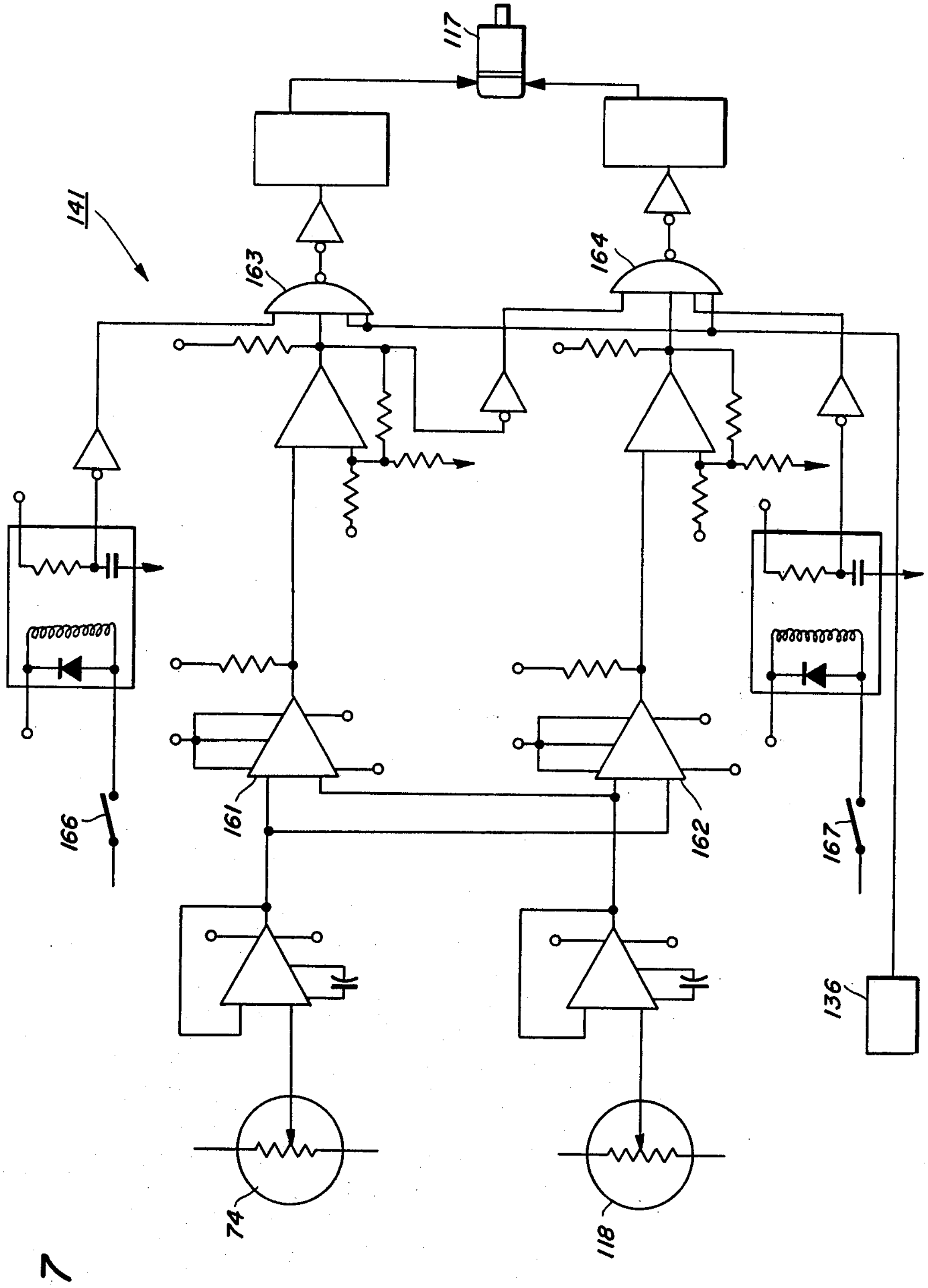
FIG. 7 is a logic schematic of the adjustable edge fadeout control of the present invention.

Referring now to FIG. 7, comparator circuit 141 includes a pair of comparator gates 161, 162 for comparing signal inputs from lens carriage potentiometer 74 and shutter potentiometer 118. The signal outputs of gates 161, 162 control forward and reverse shutter motor circuits 163, 164 which operate shutter motor 117 in either a forward or reverse direction to move shutters 110 and change the effective width of slots 104. Changing the width of slots 104 varies the size of the area erased by lamp 106 as described earlier. Limit switches 166, 167 define the outer limits of movement of shutters 110.

In operation, the signal outputs of lens and shutter potentiometers 74, 118 respectively, representing the instantaneous positions of lens carriage 53 and shutters 110 respectively are compared by circuits 161, 162. Where the signal input from lens potentiometer 74 changes, reflecting movement of lens carriage 53, an unbalance in the signal inputs to circuits 161, 162 occurs. Depending on the relative polarities, a signal appears at the output of gate 161 or 162 to trigger the shutter motor circuit 163 or 164 associated therewith to operate shutter motor 117 in either a forward or reverse direction. Shutters 110 are moved to either close off or open up slots 104.

As shutters 110 move to adjust the size of slots 104, the signal output of potentiometer 118 changes in accordance therewith. On the signal from potentiometer 118 equaling that of lens potentiometer 74, the output signal from the comparator gate 161 or 162 previously actuated ceases rendering the motor operating circuit 163 or 164 associated therewith inoperative. Shutter drive motor 117 is deenergized to terminate movement of shutters 110.

Comparator circuit 142 correlates the on/off time of pitch fadeout lamp 125, which functions to erase nonimage areas extending transversely to the direction of belt movement (i.e. areas on belt 2 between adjoining images), with the actual size of the image produced by lens 37. Circuit 142 also correlates on/off timing of lamp 125 with the placement of the image on belt 2, as determined by the setting of image position selector 170 as will appear more fully herein.

Figure 8:
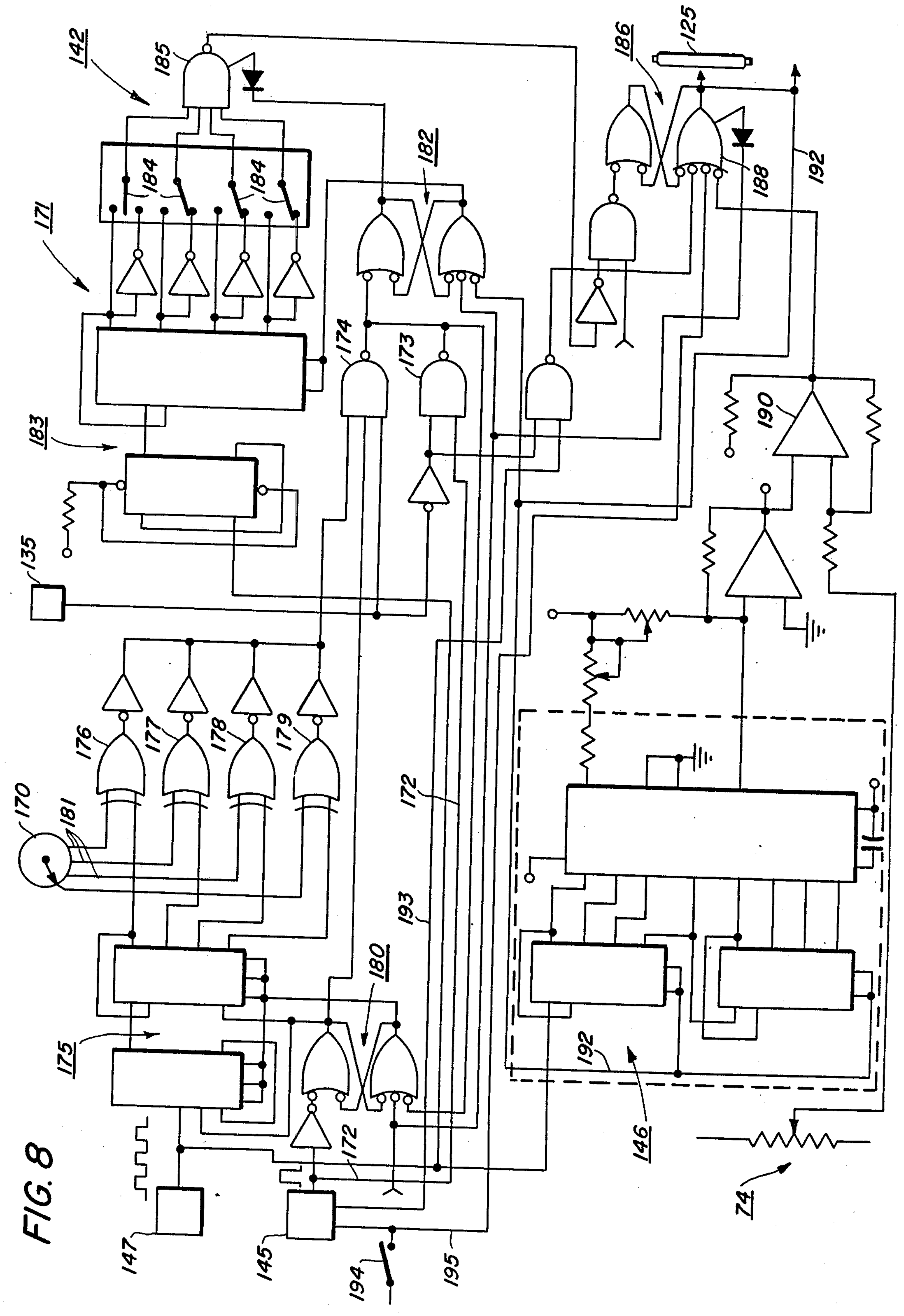
FIG. 8 is a logic schematic of the pitch fadeout control used for the present invention.

In FIG. 8, fadeout lamp 125 is, subject to the control exercised by comparator circuit 142, normally on. This means that, until lamp 125 is turned off, all areas of belt 2 passing thereunder, are discharged, i.e. erased. As explained heretofore in connection with FIG. 2, one edge, i.e. the leading edge of the image projected by lens 37 has constant registry with belt 2 irrespective of magnification changes. Thus for example, on a decrease in image size, the image trailing edge and side edges only move in toward the image center.

In theory, and subject to changes in placement of the image on belt 2 as determined by the setting of selector 170, the turn-off time for fadeout lamp 125 is the same for all images regardless of image size. In actual practice, equipment limitations and aging may require modifications in the turn-off time of fadeout lamp 125, and for this purpose trim circuit 171 is provided as will appear.

In FIG. 8, the lamp turn-off signal from machine control logic 145 is fed via line 172 to control gate 173 which together with control gate 174 forms an OR type circuit for separating manual zoom operation, initiated by actuation of zoom selector 135, from operation of the other selectors 131, 132, 133 and 134. As will appear, displacement of the image projected onto belt 2 is permitted only during operation under manual zoom. A select signal from manual zoom selector 135 is inputted to both control gates 173, 174.

A suitable timing register 175, driven by pulse generator 147, is provided. The several output gates of register 175, at which signals appear in timed progression following setting of register 175, are coupled to gates 176, 177, 178, 179 respectively. Flip flop 180 serves to set register 175 in response to a lamp turn-off signal from the machine main logic 145. The several output gates of image position selector 170 are inputted via lines 181 to gates 176, 177, 178, 179.

The signal output of gates 173, 174 are inputted to flip flop 182 controlling setting of register 183 of trim circuit 171. Register 183 is driven by pulse generator 147. The several output gates of register 183 are coupled through manually settable selector switches 184 to trim circuit output gate 185, switches 184 serving to permit timing of the fadeout lamp turn off signal to be optimized.

The output of gate 185 is fed to the set gate of flip flop 186. The signal output of flip flop 186 is inputted to fadeout lamp control circuit 188.

To turn fadeout lamp 125 back on in conjunction with the trailing edge of the image, the signal output of lens potentiometer 74 is fed to comparator gate 190. The output of comparator gate 190 (i.e. the lamp turn-on signal) is inputted to the fadeout lamp control circuit 188.

To permit the analog type signal output of potentiometer 74 to be compared with the digital type control signal used to turn lamp 125 off, digital to analog converter circuit 146 is provided. Circuit 146 provides a ramp-like input to comparator gate 190 in response to the pulse like input from generator 147, set control for circuit 146 being in response to the signal output of lamp control circuit 188 through line 192.

In operation, and as described heretofore, fadeout lamp 125 is normally on. Presuming machine operation under one of the image size selectors 131, 132, 133 or 134 the fadeout lamp turn-off signal from machine logic 145 actuates control gate 173. The signal from gate 173 to flip flop 182 sets register 183 of trim circuit 171 which, depending upon the setting of selector switches 184, may or may not impose a preset delay in the actuation of gate 185. Upon actuation, the signal from gate 185 sets flip flop 186 triggering lamp control circuit 188 and turning fadeout lamp 125 off.

The lamp turn-off signal from circuit 188 sets digital to analog converter 146 through line 192 to initiate operation of comparator circuit 190. Circuit 190 matches the progressively changing signal voltage input from converter 146 which the signal voltage from lens potentiometer 74, and on matching thereof, resets lamp control circuit 188 to turn fadeout lamp 125 back on.

In situations where manual zoom control is exercised, actuation of selector 135 disables control gate 173 while enabling gate 174. The turn-off signal from machine logic 145 to flip flop 180 sets register 175. Depending on the setting of image position selector 170, a preset time delay may be interposed through operation of register 175 before the gate 176, 177, 178 or 179 enabled by selector 170 is triggered to place an actuating signal on control gate 174. Thereafter, as described, the lamp turn-off signal passes through edge trim circuit 171 to trigger lamp control circuit 188 and turn lamp 125 off.

To obviate any malfunction in the aforedescribed fadeout lamp control that might lead to lamp 125 being held in an off condition beyond a predetermined maximum point, machine logic 145 produces a lamp turn-on pulse a preset maximum interval after the aforedescribed lamp turn-off pulse. The lamp turn-on pulse which appears in line 193, functions to trigger lamp control circuit 188 to turn lamp 125 on irrespective of the control input from flip flop 180.

As described earlier, machine logic 145 includes various sensors responsive to internal machine malfunctions one of which, jam switch 194 is shown for illustrative purposes. The signal output generated by a machine malfunction sensor such as switch 194 in the event of a malfunction, is inputted directly to lamp circuit 188 via line 195. In the event of a machine malfunction, such as a paper jam, the signal output from the sensor responding thereto, i.e. switch 194, triggers lamp control circuit 188 to turn fadeout lamp 125 on.

Figure 9:
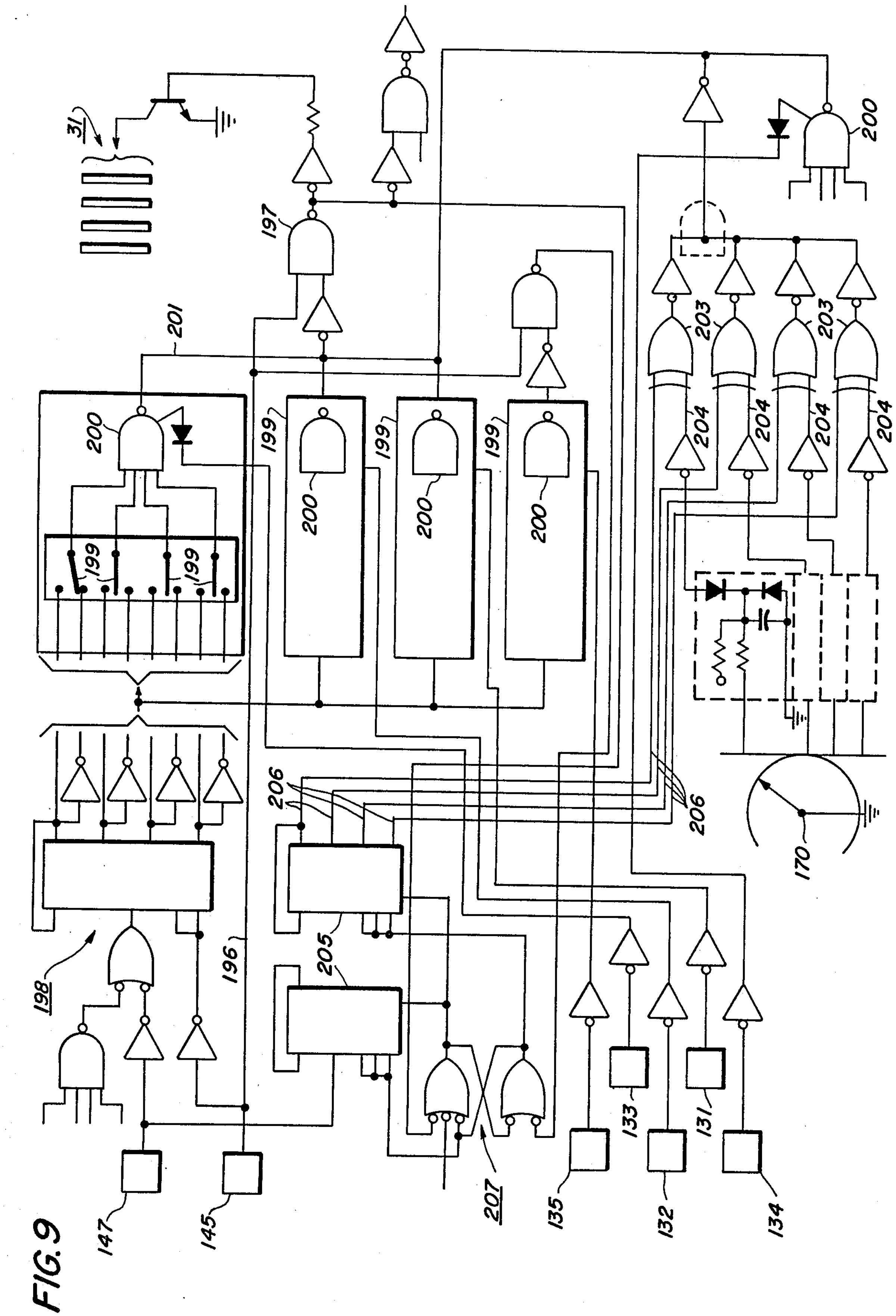
FIG. 9 is a logic schematic of the flash lamp exposure control of the present invention.

Referring to FIG. 9, the flash triggering signal from machine logic 145 is inputted via line 196 to flash lamp control gate 197. A register 198, which is driven by signal generator 147, is provided, the output gates thereof being connected through multi-contact selector switches 199 with output gates 200. Line 201 carries the signal output from gates 200 to lamp control gate 197. Output gates 200 are individually enabled in response to actuation of the image size selector 131, 132, 133 or 134 associated therewith.

Selector switches 199 and register 198 cooperate to impose, where desired, a pre-selected delay on the triggering signal from logic 145 to flash lamp control gate 197 depending upon the setting of switches 199. This enables critical adjustment in the position of the image projected onto photosensitive belt 2 to be made.

In operation, actuation of one of the selectors 131, 132, 133 or 134 enables the output gate 200 associated therewith. The flash energizing signal generated by machine logic 145 passes via the gate 200 selected, where a preset delay determined by the setting of the selector switch 199 associated therewith may be imposed, to flash lamp control gate 197. The signal input to gate 197 triggers flash lamps 31 to expose the document on platen 30.

To enable the position of the image projected onto belt 2 to be changed, selector switch 170 is provided. The several contacts of switch 170 are connected to exclusive OR gates 203 by lines 204. A register 205, driven from pulse generator 147, is provided. The several output gates of register 205, where signals appear in preset progression, are connected by lines 206 to gates 203. Register 205 is set on a signal from output gate 200′ for switch selector 199′ through flip flop 207. Switch selector 199′ receives inputs from register 198 as described heretofore. Output gate 200′ is enabled by actuation of manual zoom selector 135.

In operation, zoom potentiometer 135' is set for the image size desired and selector 135 actuated to move zoom lens 37 to the position selected as described heretofore. The signal from selector 135 enables output gate 200', so that the flash signal from logic 145 is adjusted in accordance with the setting of image position selector switch 170. It will be understood that switch 170 incorporates a normal position at which no change in the flash signal timing, and accordingly no displacement of the image projected onto belt 2 occurs. The remaining positions of selector switch 170 preferably impose stepped delays in the transmittal of the flash signal to provide progressive displacements of the projected image. As described in conjunction with FIG. 8, correlated adjustment in the timing of fadeout lamp 125 is provided.

While displacement of the image produced by lens 37 on photoreceptor belt 2 has been disclosed in conjunction with operator controlled or manual zoom selector 135, it will be understood that image displacement may be associated with one or all of the selectors 131, 132, 133 and 134 in addition to or in place of zoom selector 134.

As will be apparent from the foregoing, changes in timing of the flash signal, which works through flash lamp control gate 197 to trigger, i.e. activate, flash illumination lamps 31, displaces the image produced on photoconductive belt 2. This displacement takes place along the longitudinal axis of belt 2, i.e. the axis parallel the direction of belt movement, as indicated by the solid line arrow in FIGS. 1 and 2. Since the arrival of copy sheets 28 at transfer station 15 (where the developed images are transferred from belt 2 to sheets 28 individually) is preset due to the action of register fingers 7, displacement of the latent electrostatic image produced on belt 2 effects a corresponding displacement or shift in the position of the developed image on the copy sheet. This shift in position of the image on the copy sheet takes place along the axis paralleling the direction of movement of copy sheets 28 through the reproduction machine 1.

As best seen in FIG. 2, a side edge of the original 6 being copied is located, i.e. registered along a common line, represented by register guide 40. This edge of the original, due to the image directional changing effects of mirror 36, 38, appears as the leading edge (considered in the direction of movement of belt 2 as shown by the solid line arrows in FIGS. 1 and 2) of the latent electrostatic image formed on belt 2. The corresponding edge on copy sheet 28 is represented by numeral 300 in FIG. 2.

Normally, original 6 consists of a body of information 302, such as typing, drawings etc with top, bottom, and side margins 303, 304, 305, 306 respectively therearound. These are designated by numerals 302', 303', 304', 305', and 306' on copy sheet 28. Displacement of the latent electrostatic image formed on belt 2 by altering the flash signal timing displaces the image produced on copy sheet 28 either forward or backward along the direction of movement of sheet 28 to either increase or decrease the size of the leading edge margin 305'. The trailing edge margin 306 undergoes a corresponding change in size, margin 306' decreasing with an increase in margin 305' size, and vice versa. By this arrangement, the size of margins 305', 306' can be varied to accommodate other purposes, i.e. stapling, binding, etc.

Increasing the size of one of the margins, i.e., leading edge margin 305', may cause the opposite margin, in this case trailing edge margin 306, to be deleted as well as portions of the information 302' adjacent thereto. To compensate for this, and restore the informational areas of the original deleted (and some part of the trailing edge margin 306' if desired), lens 37 may be operated to reduce the image size. Conveniently, this may be effected by means of manual zoom selector 135 and potentiometer 135' thereof, potentiometer 135' being adjusted until the desired image size is obtained. The setting of lens 37 and hence the size of the image produced, as well as the size of any trailing edge 306' that is restored, may be checked by running one or more sample copies on reproduction machine 1. By a judicious setting of zoom lens 37, the maximum size image of the information area 302' for the size leading edge margin 305' desired can be obtained.

While the invention has been described with reference to the structure disclosed, it is not confined to the details set forth, but is intended to cover such modifications or changes as may come within the scope of the following claims.

What is claimed is:

1. In an electrostatic reproduction apparatus having a movable photosensitive member on which latent electrostatic images of originals being reproduced are formed; means to charge the member in preparation for imaging; exposure means for generating the image; developing means to develop the images; said exposure means including a movable lens means; drive means to operate said lens means and vary the lens setting and the size of the images produced; and control means for controlling said drive means and the setting of said lens means; the improvement wherein said lens means includes means for providing images of infinitely variable sizes, with said control means including a first control adapted when actuated to energize said drive means to set said lens means at predetermined settings whereby to produce images of preset size on said photosensitive member, and a second control adapted to override said first control and energize said drive means to change the setting of said lens means whereby to produce different size images on said photosensitive member of non-preset sizes.

2. The reproduction apparatus according to claim 1 including stop means defining maximum and minimum settings for said lens means, said stop means being adapted to intervene and override said control means and deenergize said drive means on said lens means reaching one of said maximum and minimum settings.

3. The reproduction apparatus according to claim 1, in which said control means includes means to change said first control preset lens settings.

4. The reproduction apparatus according to claim 3, wherein said means for changing said preset lens settings comprises:

a variable source of potential coupled to said control means and cooperating therewith to provide changed preset lens settings according to the potential level of the source.

5. The reproduction apparatus according to claim 1, including means to displace the image projected by said lens means along said photosensitive member.

6. The reproduction apparatus according to claim 5, in which said exposure means comprises at least one flash lamp effective when triggered to illuminate the original being copied, said image displacing means comprising means to vary timing of said flash lamp triggering.

7. The reproduction apparatus according to claim 1, including erasure means to discharge areas of said photosensitive member outside the perimeter of the latent electrostatic images formed thereon to prevent developement thereof by said developing means, and means for varying the size of the area discharged in response to the setting of said lens means.

8. The reproduction apparatus according to claim 7, in which said erasure means includes side edge erasure slots extending in a direction substantially perpendicular to the direction of movement of said photosensitive member, means to illuminate said photosensitive member through said slots and erase the charge on the areas of said member opposite thereto, shutter means for varying the effective size of said slots to change the size of the areas of said member erased, and an electronic control means responsive to the setting of said lens means to operate said shutter means to match the size of said erasure slots with the size image produced by said lens means.

9. The reproduction apparatus according to claim 7, in which said erasure means includes means to discharge areas of said photosensitive member bordering the image leading and trailing edges, and timing control means for varying the operational timing of said discharge means in response to the setting of said lens means whereby to correlate actuation of said discharge means with the size image produced by said lens means.

10. The reproduction apparatus according to claim 9, in which said timing control means includes means responsive to a predetermined malfunction of said apparatus to intervene and actuate said discharge means to erase said photosensitive member.

11. The reproduction apparatus according to claim 9, in which said timing control means includes limit means adapted following a predetermined maximum off interval of said discharge means to intervene and actuate said discharge means.

12. In an electrostatic reproduction apparatus having a movable photosensitive member on which latent electrostatic images of originals being reproduced are formed together with means to charge the member in preparation for imaging; exposure means for generating the image; developing means to develop the images and render the images visible, the exposure means including lens means for producing images of variable size, and lens setting means for adjusting the lens means to change the size of the image produced; the improvement comprising:

a zoom lens assembly in said lens means for producing images of infinitely variable size;

control means for operating said lens setting means and changing the size of the image produced, said control means including at least one selector preset to produce an image of predetermined size, actuation of said selector operating said lens setting means to obtain said predetermined size image; and said controller having a second selector with variable settings coupled to said lens assembly for adjusting the zoom lens to provide images of a nonpredetermined size according to the setting of said second selector, while retaining said first selector setting to provide subsequent images of said predetermined size when actuated.

13. A controller for an infinitely variable lens of an electrostatic type reproduction machine adapted to provide at least one preselected lens position whereat the lens projects an image of predetermined size, and drive means for moving the lens to change the size image projected, the combination of:

means to generate an actuating signal for operating said lens drive means to move said lens to one of a first and second lens position adjacent either side of said preselected lens position;

first timing control means responding to movement of said lens to said first lens position to sustain operation of said lens drive means for a first preset interval to move said lens through said preselected lens position and beyond to said second lens position; and, second timing control means for operating said lens drive means for a second preset interval to move said lens from said second lens position to said preselected lens position.

14. In an electrostatic reproduction machine having a movable charged photosensitive member on which latent electrostatic images of originals are formed, said machine having a movable lens assembly for providing images of variable sizes, and means for sensing the position of said lens assembly, the improvement comprising apparatus for discharging areas of said photosensitive member outside the perimeter of the latent electrostatic images, said apparatus including side edge erasure slots extending in a direction substantially perpendicular to the direction of movement of said photosensitive member, means to illuminate said photosensitive member through said slots thereby erasing the charge on the areas of said member opposite thereto, movable shutter means for varying the effective size of said slots to change the size of the areas of said member to be erased, means for sensing the position of said shutter means, comparison means for comparing the outputs of said shutter position and lens position sensing means, and means coupled to said comparison means for moving said shutter means in accordance with the output of said comparison means thereby matching the size of said erasure slots with the size of the image being produced.

* * * * *